United States Patent Office 3,373,495
Patented Mar. 19, 1968

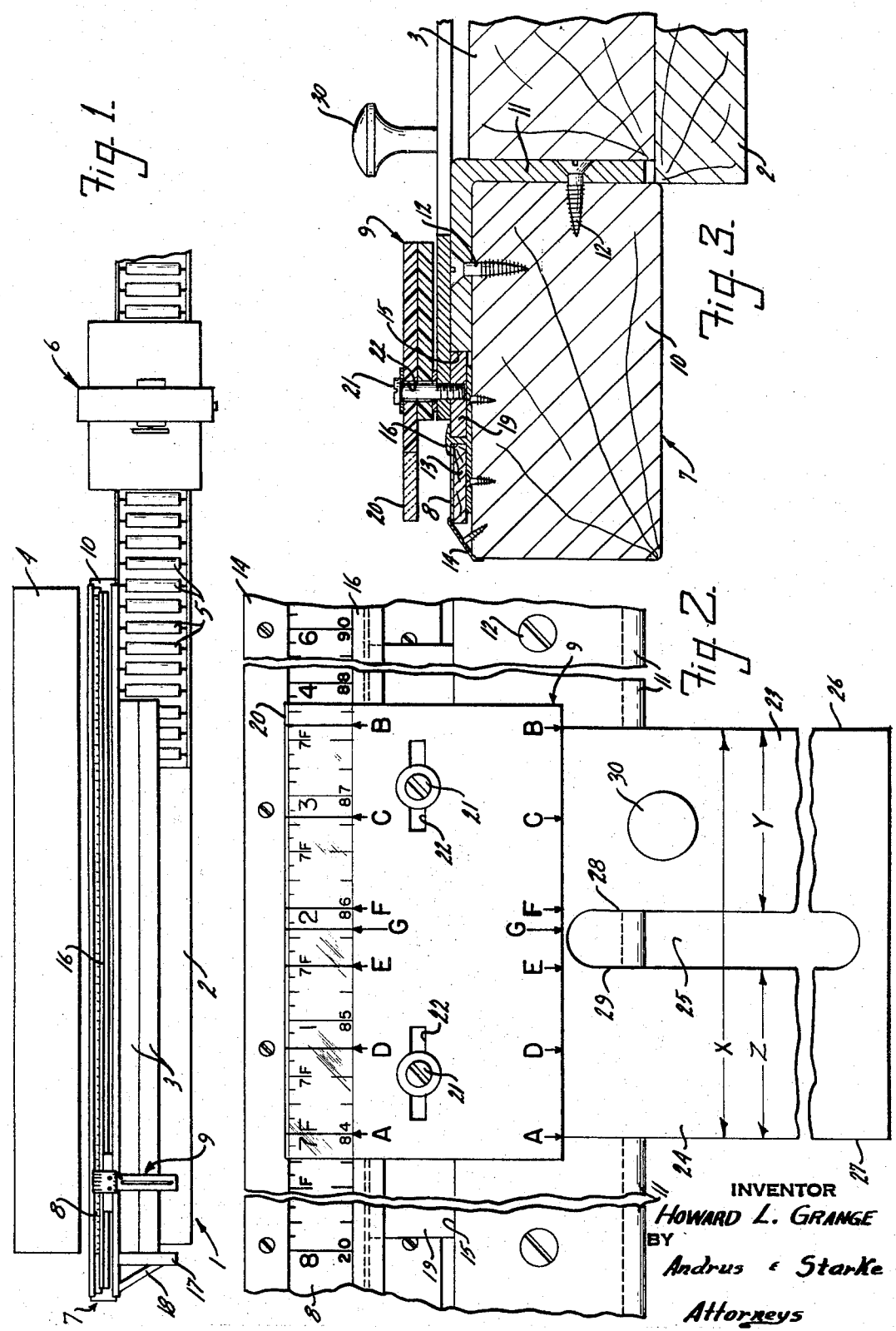

3,373,495
LAYOUT DEVICE
Howard L. Grange, P.O. Box E, Darlington, Wis. 53530
Filed Dec. 27, 1965, Ser. No. 516,571
5 Claims. (Cl. 33—76)

ABSTRACT OF THE DISCLOSURE

The invention relates to a device for transposing dimensions from building plans to lumber and includes a bench or table which supports the lumber to be dimensioned. A measuring scale is mounted on the bench and a square is mounted for sliding movement on a guide extending parallel to the scale. The square is provided with a transparent head which overlies the scale and a pair of legs extend generally normal to the guide and overlie the lumber to be dimensioned. The distance between the side edges of one of the legs is equal to a dimension of a first type of standard lumber while the distance between the side edges of the second leg is equal to a dimension of the second type of standard lumber. In addition, the distance between the outer edge of one leg to the outer edge of the other leg is equal to the width of a third type of standard lumber.

---

This invention relates to a layout tool and more particularly for a tool for transposing floor plan dimensions to the rough lumber or other components of a building.

In building a home or commercial building, the floor plan dimensions indicating the room sizes, the stud positions, partition walls and the like, must be transferred to the rough lumber components of the building. This layout procedure is generally performed at the site by the carpenter and requires an interpretation of the floor plan data and the marking and identification of the rough lumber or other components of the building. The layout requires accurate measurements so that the building will conform precisely to the plans as drawn by the architect or designer and as endorsed by the owner of the building. In the normal procedure, the carpenter performs the layout on the sub-floor of the building and under these conditions, he is exposed to the elements of the weather and to outside disturbances, as well as encountering the usual shortage of data on the floor plans and specifications. This results in conditions which are not ideal for accurate and careful laying out of the floor plan dimensions on the lumber and the layout procedure, when performed in this conventional manner, cannot be controlled by either the architect or the owner of the building.

In laying out the dimensions, the carpenter ordinarily works with simple hand tools, such as the hand square, which is used not only to scribe lines for cutting, but is used for measuring lengths along the floor plates and top plates. As the hand square normally has a length of only 24 inches, a carpenter steps off the dimensions along the lumber by moving the hand square along the lumber and this step-off procedure results in cumulative errors along the entire length of the lumber being dimensioned.

In some instances, a six foot folding rule is employed for stepping off the dimensions in the layout procedure, and this is an improvement over the square because there are fewer opportunities to accumulate error.

Longer tapes are sometimes used for laying out the dimensions on the rough lumber and these aid in preventing accumulated error. However, longer tapes require two men and thus, are not normally used except for making overall width and length measurements.

An added problem encountered in the layout procedure is that the standard 2″ x 4″ used in construction has actual dimensions of 1⅝″ x 3⅝″ and because of the fractions involved, the carpenter will usually mark the location of only one side edge of the studs or partition walls. By marking only one side edge, there is the possibility that the stud, when erected, may be placed on the wrong side of the single mark.

Moreover, many floor plans give dimensions only to the centerlines of partition walls, doors and the like and this again results in the carpenter using a single mark for the location of the center of the walls, rather than deal with the addition and subtraction of fractions which is necessary in order to mark the location of both side edges of the wall.

The present invention is directed to a simple and inexpensive device for transposing floor plan dimensions to rough lumber. More specifically, the unit includes a bench or table which supports the rough lumber to be dimensioned. Generally, both the floor plate and the top plate are positioned in side-by-side relation on the bench and the ends of the plates are engaged with a stop. Extending along the bench is a measuring tape or scale and the zero marking of the tape is in alignment with the stop on the bench.

A square is mounted for sliding movement on the bench and is provided with a transparent head which overlies the tape. The square has two legs and the overall width between the outer side edges of the legs is 3⅝″, which is the dimension or length of the common 2″ x 4″. One of the legs has a width of 1⅝″ equal to the width of a common 2″ x 4″, while the other of the legs has a width of 1½″.

The transparent head is provided with an indicator line or mark which is located at the mid-point or centerline between the outer edges of the legs and in addition, the head is provided with a pair of markings which are located in alignment with the side edges of each individual leg.

To lay out the floor plan dimensions on the lumber, the floor plate and top plate are positioned on the bench with the ends of the plates up against the stop. The square is then moved across the tape to the desired dimension and the operator then marks along the side edges of the legs to indicate the position of the various elements which can be a wall stud, window opening stud, door opening stud, partition wall, or the like. For example, to locate the position of a stud, the centerline of the 1⅝″ leg is moved to overlie the proper dimension and the operator then marks or scribes along the side edges of that leg to indicate the position of the stud. To locate a partition wall, the indicator mark indicating the centerline of the outside edges of the combination of legs is positioned at the desired dimension and the operator then scribes along the outside edge of each of the legs indicating the 3⅝″ dimension for the partition wall.

The present invention is an inexpensive device which accurately positions the location of studs, door openings, window openings, partition walls and the like, on the rough lumber. The layout can be accomplished by one man and eliminates all possibilities of cumulative errors which occur when the lumber is laid out in the conventional manner with hand tools. This insures that the building will accurately represent the floor plan and eliminates any looseness in the interpretation and laying out of the dimensions on the rough lumber.

Other objects and advantages will appear in the course of the following description.

The drawings illustrate the best mode presently contemplated of carrying out the invention.

In the drawings:

FIG. 1 is a top plan view of the workbench and easel;
FIG. 2 is an enlarged plan view of the square; and FIG. 3 is a transverse section taken through the guide bar.

The drawings illustrate an apparatus for laying out floor plan dimensions on rough lumber and includes a bench 1 having a layout surface 2 to support the lumber 3 to be dimensioned. In normal procedure, the lumber to be dimensioned will be the floor or sole plate and the top plate, which are located in side-by-side relation on the supporting surface 2. To enable the operator to view the floor plan, an easel 4 is located adjacent the bench 1 and is provided with an inclined surface on which the floor plan is supported during the layout operation.

As shown in FIG. 1, a series of rollers 5 are located at the end of the supporting surface 2 and aid in moving the dimensioned lumber to a saw 6 where the lumber can be cut to any required size marked on the lumber during the layout procedure.

Mounted on the bench 1 is a guide bar 7 which extends substantially the length of the bench and a measuring tape 8 is supported on the upper surface of guide bar 7. A square 9 is mounted for sliding movement on the guide bar 7 and is adapted to be moved along the supporting surface to mark off the dimensions on the lumber 3.

As best shown in FIG. 3, the guide bar 7 is provided with a central core which can be formed of the 2" x 4" or the like, and an angle facing member 11 is secured by screws 12 to the forward and upper edge of the core 10. Mounted on the core 10 in spaced relation to the angle 11 is a strip 13 and the tape 8 is secured to the upper surface of the strip 13. Tape 8 is retained on the supporting strip 13 by a retaining clip 14 which is screwed to the core 10.

The space between the angle 11 and the supporting strip 13 defines a slot or groove 15, and a guide strip 16 is secured to the core and extends partially over the slot 15.

To properly position the lumber 3 with respect to the tape 8, a stop 17 extends outwardly from the angle 11 and is reinforced by a diagonal brace 18. The stop 17 is positioned at 90° with respect to guide bar 7 and is located at the zero point of the tape 8 so that the end of the lumber 13 will be positioned at the zero mark.

The square 9 includes an arm 19 which is slidably mounted within the slot 15 so that the square 9 can be moved longitudinally along the layout surface 2. In addition to the arm 19, the square 9 is provided with a generally transparent head 20 which overlies the tape 8, as best shown in FIG. 2. Head 20 is secured to the body portion of the square 9 by a pair of bolts 21 which extend through slots 22 in the head. The slotted connection between the head 20 and the body of the square 9 permits the head to be adjusted longitudinally to compensate for any misalignment between the zero point on the tape and the stop 17.

The body portion of the square 9 includes a pair of legs 23 and 24 which are separated by a slot 25. The width of leg 23, as indicated by Y in FIG. 2, is equal to 1⅝" which is the width of a standard 2" x 4". The width of leg 24, as indicated by dimension Z in FIG. 2, is 1½" which is the width of a second type of conventional stud. In addition, the dimension X which is the overall width between the side edges 26 and 27 of legs 23 and 24, is 3⅝" which is the length of a standard 2" x 4". As best shown in FIG. 2, the transparent head 20 is provided with an indicator line or mark G which overlies the tape 8 and is positioned at the midpoint or centerline of the edges 26 and 27, or dimension X. By positioning the marking G at the proper dimension on tape 8, the location of a partition wall can be inscribed on the lumber 3 by marking along the edges 26 and 27.

In addition, indicator lines E and F are located on the head and correspond to the edges 29 and 28, respectively, and indicator lines A and B which are in alignment with side edges 27 and 26, respectively, are also located on the head 20. A centerline D is positioned on the head 20 at the midpoint between lines A and E or edges 27 and 29, while a second centerline C is located at the midpoint or centerline between the markings F and B or edges 28 and 26. By positioning the line C at the proper location on tape 8, the position of a stud can be marked on the lumber 3 by scribing along the edges 26 and 28.

A handle 30 is attached to leg 24 and enables the square 9 to be readily moved along the guide 7.

In using the apparatus to lay out floor plan dimensions, the unit is initially calibrated by positioning the edge 27 in alignment with the stop 17. The head can then be moved by adjustment of the bolts 21 until the line A on the head directly overlies the zero point on the tape or scale 8. When this is accomplished, the bolts can be tightened and the square will then compensate for any error in alignment between the stop 17 and the zero point on the tape.

The top plate and floor plate are then positioned on the supporting surface 2 in side-by-side relation against guide bar 7 with the ends of the plates located in engagement with the stop 17. With the lumber properly positioned, the square 9 is then run along the lumber and the various locations of studs, door openings, window openings, partition walls and the like, are marked on the lumber.

When using 1⅝" lumber, the position of a wall stud is marked off by locating the line C at the proper position on tape 8, and the location of the stud is then marked by scribing along the edges 26 and 29. Similarly, the position of a partition wall is marked by locating the mark G directly above the proper reading on the tape 8 and the location of the partition wall can then be marked on the lumber by scribing along the lines 26 and 27.

When 1½" lumber is used instead of 1⅝" the position of the wall studs are marked by utilizing the edges 27 and 29 rather than edges 26 and 28, as previously described.

It is contemplated that the layout apparatus of the invention can be used either in the shop or in the field. If used in the field, it is contemplated that the alignment bar 7 can be made in a series of sections and assembled on a suitable bench or horses in the field. When the unit is to be assembled in the field and subsequently disassembled, the adjustment of the head 20 provided by the bolts 21 is important in insuring that the device is in proper alignment when installed.

The present invention accurately positions the location of studs, door openings, window openings, partition walls and the like on the rough lumber. The entire operation can be performed by one man and eliminates any cumulative errors which generally occur with conventional layout procedures.

Various modes of carrying out the invention are contemplated as being within the scope of the following claims particularly pointing out and distinctly claiming the subject matter which is regarded as the invention.

I claim:

1. An apparatus for laying out floor plan dimensions on lumber, comprising a supporting surface and including a longitudinally extending guide, said lumber being supported on said surface and positioned against said guide, a measuring scale extending along said supporting surface and disposed generally parallel to said guide, a unit mounted for movement on said guide and having a measuring section and a marking section, said measuring section located in measuring relation with said scale and said marking section extending over said supporting surface, said marking section including a pair of generally parallel scribing edges extending normal to said guide with—the distance between the scribing edges of said marking section being equal to a dimension of standard lumber, and an indicating line on said measuring section in measuring relation with said scale, said indicating line located on the center line between said scribing edges, the marking section includes a pair of legs with the first leg having a pair of generally parallel first side edges disposed perpendicular to the guide and said second leg having a pair of generally parallel side edges disposed perpendicular to the guide, the distance between the first side edges being equal to a dimension of a first type of standard lumber and the distance between the second side edges being different than said first distance and being equal to a dimension of a second type of standard lumber.

2. The apparatus of claim 1, in which the distance between the outer of said first side edges to the outer of said second side edges is equal to the width of a standard piece of lumber.

3. The apparatus of claim 1 in which the measuring section includes a first indicating line located on the centerline between said first edges, a second indicating line located on the centerline between said second edges, and a third indicating line located at the centerline between the outer of said first side edges and the outer of the second side edges.

4. The apparatus of claim 1, in which the measuring section includes a transparent head overlying the scale.

5. An apparatus for laying out dimensions on lumber, comprising a guide member adapted to be moved along a guide surface, a measuring scale disposed generally parallel to said guide member, a pair of legs attached to the guide member and extending normal to the direction of movement of said guide member on said guide surface, a first of said legs having a pair of generally parallel first side edges and the second of said legs having a pair of generally parallel side edges, the distance between said first side edges being equal to a dimension of a first type of standard lumber and the distance between said second side edges being different than said first distance and being equal to a dimension of a second type of standard lumber.

References Cited

UNITED STATES PATENTS

| 419,640 | 1/1890 | Class | 33—81 |
| 720,179 | 2/1903 | Rounds | 33—99 |
| 826,425 | 7/1906 | Heathcote | 33—76 |
| 847,610 | 3/1907 | Schantz | 33—76 |
| 1,730,852 | 10/1929 | Jenny | 33—76 X |
| 2,058,091 | 10/1936 | Marsella et al. | 33—76 X |
| 2,837,825 | 6/1958 | Clifford et al. | 33—32 |
| 3,118,233 | 1/1964 | Mesa | 33—76 X |
| 3,169,320 | 2/1965 | Currie | 33—96 |

FOREIGN PATENTS

| 547,455 | 10/1957 | Canada. |

HARRY N. HAROIAN, *Primary Examiner.*